(12) United States Patent
Wang et al.

(10) Patent No.: US 11,719,308 B1
(45) Date of Patent: Aug. 8, 2023

(54) DAMPING SEGMENTAL RING STRUCTURE FOR SUBWAY TUNNELS BUILT IN GRIM ENVIRONMENTS OF DEFORMABLE GROUND

(71) Applicants: Dongyuan Wang, Austin, TX (US); Long Shi, Chengdu (CN); Jianguo Fan, Tianjin (CN); Jixiang Li, Chengdu (CN); Ying Han, Chengdu (CN)

(72) Inventors: Dongyuan Wang, Austin, TX (US); Long Shi, Chengdu (CN); Jianguo Fan, Tianjin (CN); Jixiang Li, Chengdu (CN); Ying Han, Chengdu (CN)

( * ) Notice: Subject to any disclaimer, the term of this patent is extended or adjusted under 35 U.S.C. 154(b) by 331 days.

(21) Appl. No.: 17/112,984

(22) Filed: Dec. 5, 2020

(51) Int. Cl.
    *F16F 15/08*     (2006.01)
    *B61B 13/10*     (2006.01)
    *F16F 3/10*     (2006.01)

(52) U.S. Cl.
    CPC ............ *F16F 15/085* (2013.01); *B61B 13/10* (2013.01); *F16F 3/10* (2013.01); *F16F 2224/025* (2013.01);
(Continued)

(58) Field of Classification Search
    CPC .... F16F 15/085; F16F 3/10; F16F 2224/0208; F16F 2224/025; F16F 2226/04;
(Continued)

(56) References Cited

U.S. PATENT DOCUMENTS

| | | | | |
|---|---|---|---|---|
| 1,948,211 A | * | 2/1934 | Fritz | F16L 27/1021 464/95 |
| 3,460,856 A | * | 8/1969 | Van Tine | F16L 51/024 285/55 |

(Continued)

FOREIGN PATENT DOCUMENTS

| | | | | | |
|---|---|---|---|---|---|
| CN | 205477646 U | * | 8/2016 | | |
| FR | 2148796 A5 | * | 3/1973 | .......... | F16L 27/1021 |
| GB | 1512320 A | * | 6/1978 | .......... | F16L 27/1021 |

*Primary Examiner* — Xuan Lan Nguyen
(74) *Attorney, Agent, or Firm* — J.H. Lin Patent Law P.C.; John H. Lin

(57) ABSTRACT

The present invention of damping segmental ring structure for subway tunnels built in grim environments of deformable ground can mitigate the stress-concentration of the tunnel lining structures. The deformable ground can be caused by differential settlement or high-intensity earthquakes. Embodiments of the invention have self-adjustment features and forms for deformation and rotation, which comprise one adapter in the middle, two transitional grooved segmental structures, and an internal steel tube. All three forms comprised 3 or 4 pieces with the same features so they can be easily installed, transported and erected on sites and bolts are used to bolt them together to form an integrity structure with damping characteristics. The damper placed in the middle comprises two loading plates that form the shell of the damper, the internal core of the damper which includes interbedded installed rubber pads and steel plates within the loading plates and spring systems that compress the internal core. The springs are locked to the loading plates using locking clamps and the loading plates are bolted to the transitional grooved segmental ring structures, and the transitional grooved segmental ring structures are bolted themselves in the circumferential direction to form a ring structure and bolted with the regular segmental ring structures in the longitudinal direction. The internal steel tube is concentric with the damper but has a smaller diameter so it can support the damper by fastening the counter-reaction bolts installed in the bent-up flanges of each piece. Waterproof anti-slippery rubber pads are placed in all interfaces between the damper, and the transitional segmental ring structure, the regular segmental ring structure and the internal steel tube. The invention of the damping segmental ring structure has self-adjustment capabilities for deformation and rotation whereas the stiffness remains sufficient to resist soil and (Continued)

groundwater pressure. The invented damping segmental ring structure can be manufactured in factories that manufacture the regular segmental ring structure and can be shipped to and installed on-site using the same equipment that installs the regular segmental ring structure. The internal steel tube provides double-safety for the stiffness of the damper and the supports can be adjusted during tunnel operations.

13 Claims, 10 Drawing Sheets

(52) U.S. Cl.
CPC ... *F16F 2224/0208* (2013.01); *F16F 2226/04* (2013.01); *F16F 2228/007* (2013.01); *F16F 2230/0005* (2013.01); *F16F 2230/30* (2013.01); *F16F 2234/02* (2013.01)

(58) Field of Classification Search
CPC .......... F16F 2228/007; F16F 2230/0005; F16F 2230/30; F16F 2234/02; B61B 13/10; E21D 11/038; E21D 11/385; E21D 11/083; F16L 27/1021
See application file for complete search history.

(56) References Cited

U.S. PATENT DOCUMENTS

| | | | | | |
|---|---|---|---|---|---|
| 3,527,481 | A | * | 9/1970 | Lewis | F16L 51/027 285/226 |
| 3,566,510 | A | * | 3/1971 | Wendt | F16L 27/1021 29/445 |
| 3,606,392 | A | * | 9/1971 | Garrett | F16L 55/04 175/321 |
| 4,027,902 | A | * | 6/1977 | Tanikawa | E03F 3/04 285/226 |
| 4,045,057 | A | * | 8/1977 | Halter | F16L 55/0337 181/252 |
| 4,221,502 | A | * | 9/1980 | Tanikawa | E02D 29/16 405/126 |
| 4,647,256 | A | * | 3/1987 | Hahn | F16L 9/22 138/155 |
| 5,511,828 | A | * | 4/1996 | Kurek | F01N 13/1816 285/226 |
| 5,704,657 | A | * | 1/1998 | Asanuma | E02D 29/16 285/224 |
| 5,794,987 | A | * | 8/1998 | Asanuma | E21D 11/385 285/224 |
| 6,299,214 | B1 | * | 10/2001 | Li | F16F 15/08 285/48 |

* cited by examiner

Section 1-1, See FIG. 4
Section 2-2, See. FIG. 5
Section 3-3, See FIG. 6

Section 4-4, see FIG. 10

Section 5-5, See FIG. 11

Section 6-6, See FIG. 12

Section 7-7, see FIG. 19

Section 8-8, see FIG. 20

DAMPING SEGMENTAL RING STRUCTURE FOR SUBWAY TUNNELS BUILT IN GRIM ENVIRONMENTS OF DEFORMABLE GROUND

BACKGROUND OF THE INVENTION

Field of the Invention

The invention pertains to the field of lining structure engineering of the subway tunneling industry. The invented damping segmental ring structure is suitable to be used for subway tunnels which are built in grim environments that subject to differential settlement and/or high-intensity earthquakes. More particularly, the invention pertains to a damping segmental ring structure that comprises a damper, two transitional segmental ring structures which are made of reinforced concrete and in grooved shape and placed and bolt-connected to the front and the rear ends of the damper, and a steel tube that is placed inside and supports the entire damper and the thickened edges of the transitional grooved segmental ring structures. The three main structural members thereof are composed of arc-like pieces which are more constructible in terms of installation in manufacturing factories, transportation and erection on the construction site. In principle, the number of the arc-like pieces of the adapter and the transitional segmental ring structure is half of the regular segmental ring pieces that are used for tunneling practice, and each ring of the adapter and transitional grooved segmental ring structure typically consists of 3 or 4 arc-like pieces as it is very common to use 6 or 8 pieces of regular segmental ring structure to form one ring with tunneling advancing. Each piece of the adapter and the transition segmental ring structure has an equivalent central angle of 120 degrees or 90 degrees, respectively, and can be easily installed to form a piece of the integrity segment ring structure in the manufacturing plant. The manufactured and installed adapter and the transition segmental ring structure pieces can be easily transported to the tunnel construction site just like the regular segmental ring pieces, and then can be easily erected using the same equipment that is used to erect the regular pieces of the segmental ring structure of the tunnel. The invented structure and the regular segmental ring structure pieces will be bolted together and form a closed-ring structure for tunnel lining. The steel tube also has three or four arc-like pieces with equivalent central angles of 120 or 90 degrees, correspondingly. The arc-like pieces of the steel tube are concentric with the adapter and will be assembled to form an integrity inner tube to support the entire installed tamper and the abutting thickened edges of the transitional segmental ring structures by using the counter-reaction bolting system. Waterproofing rubber gaskets are installed along with the interfaces between (1) the damper and the transitional grooved segmental ring structure; (2) the grooved segmental ring structure and the regular segmental ring structure; (3) the steel tube and the damper. More details of features and forms for each functional structural member of the instant invention are presented along with the description summary of drawings.

DESCRIPTION OF RELATED ART

Various forms of tunnel lining structure utilizing general structural and functional features heretofore have been known. Those included disclose U.S. Pat. Nos. 2,504,914, 3,815,370, 3,969,906, 4,104,885, 4,497,590, 4,647,256, 10,746,002 B2, etc. However, these previously invented tunnel lining structures include neither of forms and features of the instant invention nor have the functions of self-adjustment for deformation and rotation caused by differential settlement or earthquakes that the combined forms and features of the instant invention have. The features and forms of the instant invention enable the presented invention to be heavy-duty as well as adaptive to grim differential settlement and high-intensity seismic environments, constructible and cost-efficient. The invented structure comprising features disclosed results in fully utilizing the characteristics of the self-adjustment for deformation and rotation, waterproofing, prevention of soil and water collapsed into the tunnel, as well as easy installation and negligible disturbance to the normal construction.

U.S. Pat. No. 2,504,914 to V. F. Zahodiakin discloses a segmental piston ring made from sheet metal or the like. The piston ring has a wedge shape which is installed in the cylinder under compression and exerts a relatively uniform degree of pressure. The art can improve the capacity for the compression pressure that the segmental ring subjects, but does not have any forms and features that the instant invention has, and the object of the instant invention is different from the prior art by Zahodiakin.

U.S. Pat. No. 3,815,370 to R. B. Lennox discloses a method of forming spiral or helical tunnels and sections therefor. The section liners of a tunnel were pre-casted in concrete and then were bolted together to form the spiral or helix. The art can help the sections can be manufactured away from the construction site but the method only applies to a relatively small section. The art essentially a construction or manufacturing method, does not include any forms and features that the instant invention comprises and the object of the instant invention is different from the art by R. B. Lennox.

U.S. Pat. No. 3,969,906 to R. McBean discloses tunneling shields that can help the tunnel construction. It comprises a rearward rotatable part that can push the shield forward against the erected tunnel segment. The art of R. McBean may be the prototype of the shield machines widely used nowadays in tunneling, but the art does not have the forms and features that the instant invention comprises and the object of the instant invention is different from the art of R. McBean.

U.S. Pat. No. 4,104,885 to N. S. Thomas discloses tunneling lining that can help the tunnel construction. It comprises an end connectable concrete segment to an end of another identical segment. The art of N. S. Thomas may be the prototype but does not have the circumferential connection compared with the segment widely used nowadays in subway tunneling. The art of N. S. Thomas does not have the forms and features that the instant invention comprises and the object of the instant invention is different from the art of N. S. Thomas.

U.S. Pat. No. 4,497,590 to A. P. Chase discloses tunneling lining that can help the tunnel construction. It comprises of a plurality of prefabricated tunnel lining, interconnected longitudinally rings. Each ring comprises a plurality of interconnected ring sections and edges of rings are overlapped longitudinally and circumferentially. Bolts with one end embedded in the concrete are used to assembly these rings. Except for the flat surfaces of the rings and embedment in the concrete of the bolts, the art is very similar to the regular segmental ring structures that are widely used nowadays for tunnel lining. However, the art does not have any forms and features that the instant invention comprises and the object of the instant invention is different from the art of A. P. Chase.

U.S. Pat. No. 4,674,256 to V. Hahn discloses method and apparatus for producing underground pipes. For each pipe section, at least two partial pipe shells are used but separate longitudinally. When the pipe shells are pressed into the ground, the shells are jointly connected, and the apparatus is used to carry out the process. The method relates to producing underground pipes. The art does not have any forms and features that the instant invention comprises and the object of the instant invention is different from the art of V. Hahn.

U.S. Pat. No. 10,746,022 B2 to B. Khorshidi et al. discloses helical segment lining in the tunneling industry wherein segments are designed in a helical shape that is connected by an interlocking system. The segments have tongue and groove so they can be interlocked. However, the segment of the art has a helical shape that the widely-used segmental ring structure does not have. Moreover, the art does not have any forms and features that the instant invention comprises and the objects of the instant invention are different from the art to B. Khorshidi et al.

Based on the above review with state-of-the-art technique concerning the present invention, it is finally concluded that the instant invention comprises different forms and features from the above listed prior art and has different objects from the prior art. The instant invention is not supposed to replace the entire lining system but can install and replace several rings among them to improve the self-adjustment capability of deformation and rotation of the entire lining system, which is highly demanded by the subway tunneling industry for tunnels built in grim differential settlement and high-intensity seismic environment.

SUMMARY OF THE INVENTION

The damping segmental ring structure of the instant invention is unique because the forms and features of the instant invention and the objects are significantly different from any prior art reviewed thereof. In summary, the instant invention is not supposed to replace the entire lining system of tunnels which typically uses segmental ring structures but can install and replace several rings among them to improve the self-adjustment capability of the entire lining system. Such self-adjustment capability for deformation and rotation of the entire lining system is highly demanded by the tunneling industry for the lining structure of tunnels built in grim differential settlement and high-intensity seismic environments. The mechanism and the preferred embodiments of the instant invention are presented as follows:

Tunnels such as subways for underground transportation systems are usually built in populous metropolitan areas, where the ground settlement in a relatively large area is becoming common and severe since the groundwater withdrawal for industrial and domestic usage is becoming severe. Tunnels are sometimes built in areas that subject to rapid geologic condition change, for example, mountain areas that may have complicated geological conditions. Tunnels typically consist of different structures, such as station structures and tunnel linings. When tunnels are built in the thereof area, a settlement between different structures will be significantly different, and such difference in the settlement is termed as differential settlement, which will bring the structure to move with the ground and hence cause stress concentration, even damages, in structures. High-intensity earthquakes will generate vibrating waves and such waves will propagate in the ground and cause significant ground deformation and push the structures built in the ground to deform and/or rotate. Stress concentration, even damages, thus can be severe than that caused by differential settlement. The influential area for subway tunnels of differential settlement is likely to be approximately 150 feet from the end of a subway station or other similar structures. However, for tunnels built in high-intensity seismic environments, the entire subway line has a risk of damage, and hence the entire line of a tunnel needs to be adaptive to deformation and rotation. Characteristics of self-adjustment for deformation and rotation of structures will greatly mitigate even eliminate such risk. On the other hand, the lining structures need to be sufficiently stiff to support the earth and water pressure as well as the possible loading in the ground surface such as vehicles, pedestrians, etc. The invention built with preferred embodiments can fulfill such challenging tasks by installing the present damping segmental ring structure in every several regular rings of the subway tunnel being built in the affected area.

The damper is the core part of the invention which has the characteristics of the self-adjustment for deformation and rotation. As thereof introduced, to make installation and transportation easy, the damper comprises a plurality of arc-like pieces, and the number of the arc-like pieces is half of the numbers of the regular segmental ring structures that a subway tunnel adopts for its lining. The typical number of the arc-like pieces for the entire ring of the damper is 3 or 4 as 6 or 8 pieces of segmental ring structures are used to form a ring lining for a subway tunnel, and each arc-like piece is concentric, with the central angle of 120 degrees or degrees, respectively. It is worth noting that each piece of the adapter is still an adapter, which has two loading steel plates that are arc-like shape, concentric with the same outside and inside diameter of the regular segmental ring structure, the thickness of the two loading plates will be strong enough to bear the pulling forces of the stout spring, and each piece of the arc-like adapter comprises at least two spring systems that are installed within and locked to the two loading plates. Interbedded high-elasticity rubber pads and steel plates have holes to accommodate the springs and will be installed between the two loading plates. When the external loading that pulls the springs is removed, the springs will recover to the original position and the two loading steel plates will be pulled to approach each other and to compress the rubber pads and steel plates installed between the two loading plates.

Since rubber can expand and contract depending on the loading applied, the damper can deform and rotate with the movement of the two loading plates, which are bolted to the transitional grooved segmental ring structure. The steel plates installed with the interbedded rubber pads will stiffen the rubber pads, ensure the rubber pads are not squeezed and twisted. With more deformation and rotation, the springs get more expansion and the damper can adjust itself. On the other hand, since compression existing between two loading plates will compress the rubber pads and steel plates together, the friction among them will make the damper have suitable stiffness to resist the earth and groundwater pressures that act on the external surface of the damper.

The transitional grooved segmental ring structure functions to transit the damper to the t regular segmental ring structures of the tunnel. The transitional grooved segmental ring structures are manufactured with the same materials and method as those for regular segmental ring structures, which are typically pre-casted, reinforced concrete structure. However, the transitional grooved segmental ring structure has a grooved shape, the edges in the periphery of the structure are thickened as ribs, and more dents and holes are specifically designed to accommodate the spring systems and have the bolts pass through. The number of the pieces of the transitional grooved segmental ring structure needs to be the same as that for the damper and the arc-shape pieces have the same dimensions as the loading plates of the damper. Bolts are used not only to bolt the transitional grooved segmental ring structures together in circumferential direction but also bolt them to the loading plates of the damper and the regular segmental ring structure in the longitudinal direction.

The width of the damper may vary from 8 inches to 20 inches, and the width of the two transitional grooved segmental ring structures varies from 1.5 feet to 2.0 feet which are approximately half of the width of the regular segmental ring structure. The thickness of the thickened edges of the grooved segmental ring structure is approximately 6 to 8 inches. Such dimensions ensure the transitional segmental ring structure can be bolted with the damper and the regular segmental ring structure.

It is ideal to assemble the arc-like damper piece and the transitional grooved segmental ring structure pieces in the manufacturing plant and ship the installed piece to the tunnel construction site. The same Tunnel Boring Machine (TBM) or tunneling shield for erecting regular segmental ring structure can be used to erect the bolted damper-transitional segmental ring structure. Once they are installed to the tunnel periphery, 3 or 4 pieces of them can be bolted in the circumferential direction and then bolted to the erected regular segmental ring structure. When the invented damping segmental ring structure is installed to form a ring structure, the regular segmental ring structure will be continuously erected and bolted to the transitional grooved segmental ring structure in the rear end of the invented damping structure. During the process of installation in the manufacturing plant and erection on site, appropriate waterproof rubber gaskets shall be installed in the right places.

The steel tube consists of 3 or 4 pieces of arc-like concentric steel plates, and each piece of the steel tube has a central angle of 120 or 90 degrees correspondingly. The thickness of the steel tube is about one-inches, the outer diameter of the steel tube is slightly smaller than the inner diameter of the damper and the transitional segmental ring structure so the rubber pad can be installed along with the interface between the outer surface of the steel tube and the inner surface of the damper and the thickened edges of the transitional segmental ring structure. In order to be bolted together and tighten the contact between the steel tube and the rubber pad, each piece of the steel plate has inwards-bent flanges, which are measured as 4 to 6 inches, to be used to install the counter-reaction bolting system. When the counter-reaction nuts are fastened, the steel tube is pushed to compress the rubber pad and thus support the damper and the abutting edges of the transitional segmental ring tightly. It is noteworthy that the counter-reaction bolting system can be used to tighten or loosen the steel tube during the operation period of the tunnel, and such features ensure the invention more adaptive to deformation and/or rotation caused by differential settlement and/or high-intensity earthquakes.

It is easy to manufacture the damper and the transitional grooved segmental ring structure in the manufacturing plant for regular segmental ring structures. The practitioner of the tunnel lining structure can handle the design for manufacturing easily. No special transportation is needed to ship the installed piece of the damper and the transitional grooved segmental ring structure to the construction site of tunnels. Normal construction equipment for tunneling and erection of regular segmental ring structure can be used to erect the invented damping ring structure pieces. The disturbance to the normal construction process is negligible, thus the instant invention is very constructible.

The invented damping segmental ring structure can be installed in every several rings of the regular segmental ring structure of the tunnel in the area where is affected by the differential settlement or high-intensity earthquakes, not all the segmental ring structures need to be replaced. The cost of the application of the instant invention is very cost-coefficient comparing with other mitigation methods for tunnels or other underground structures built in a grim environment that hazards caused by differential settlement or high-intensity earthquakes are severe.

Finally, the present invention to be specifically enumerated herein is to provide a damping segmental ring structure for subway tunnels built in a grim differential settlement and high-intensity seismic environments following the proceeding forms and features of manufacture. Below is the summary of the nomenclature that the numerals represent:

1—transitional grooved segmental ring structure; 2—damper; 3—internal steel tube; 4—Type I waterproofing rubber gasket; 10—one piece of transitional grooved segmental structure; 11—preserved holes for anchor bolts for the damper and the transitional grooved ring structure; 12—Anchor bolts to bolt transitional grooved segmental ring structure in circumferential direction; 13—preserved holes in segmental ring structure for anchor bolts used in circumferential direction; 14—steel cap used to form a dent in segmental ring structure; 20—one piece of the damper; 21—one piece of the left loading plate of the damper; 22—internal core of the damper; 23—one piece of the right loading plate of the damper; 24—waterproof rubber gasket covering the external surface of the damper; 25—anchor bolts bolting the damper and the transitional ring structure in longitudinal direction; 26—spring system of the damper; 27—rubber pads for the internal core of the damper; 28—steel plates of the internal core of the damper; 29—stout extension springs of the damper; 30—hooking head of the spring; 31—locking clamp; 32—washers for locking clamp; 33—preserved holes in the hooking head (for the pulling hook to extension springs); 34—staggered leaves of the locking clamp; 35—pintle of the locking clamp; 41—waterproof rubber gasket for internal tube; 42—piece of the internal tube; 43—counter-reaction bolts for the internal tube; 44—flange of the internal tube; 50—piece of regular segmental ring structure; 51—type II waterproof rubber gasket used in interface between transitional grooved segmental ring structure and regular; 52—relief spring; 53—bolts connecting the invented structure with regular segmental ring structure in longitudinal direction; 60—one piece of damping segmental structure; 100—damping segmental ring structure; 200—regular segmental ring structure; 300—subway station or other structure that is different from the segmental ring structure used for tunneling lining.

The forms and features of the foundation comprised are economically feasible, durable, reliable and cost-efficient. These together with other objects and advantages which will become subsequently apparent reside in the details of construction and operation as more fully hereinafter described and claimed, reference being had to the accompanying drawings forming a part hereof, wherein like numerals refer to the like parts throughout.

DETAILED DESCRIPTION OF THE PREFERRED EMBODIMENTS

Figure 1:
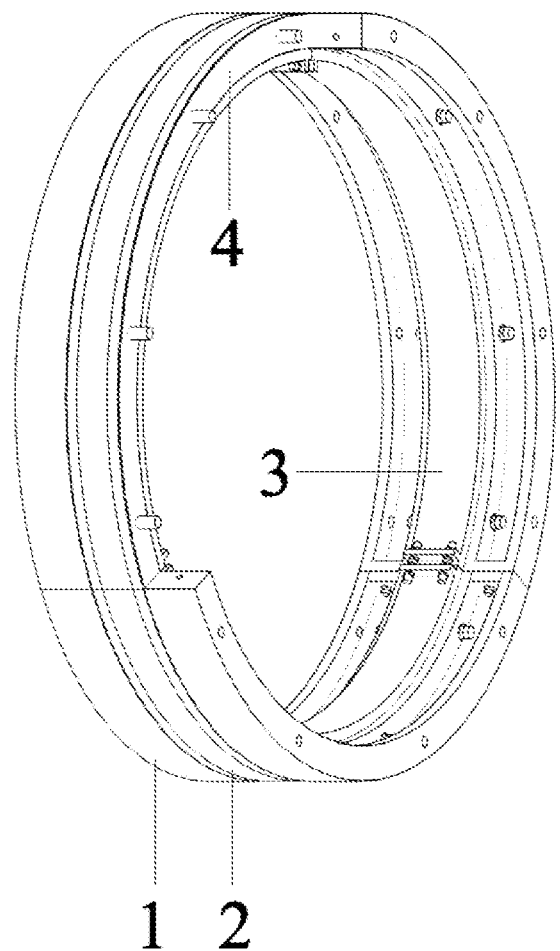
FIG. 1 is a three-dimensional illustration of the invented damping segmental ring structure for subway tunnels built in a grim differential settlement and/or high-intensity seismic environment.
Figure 2:
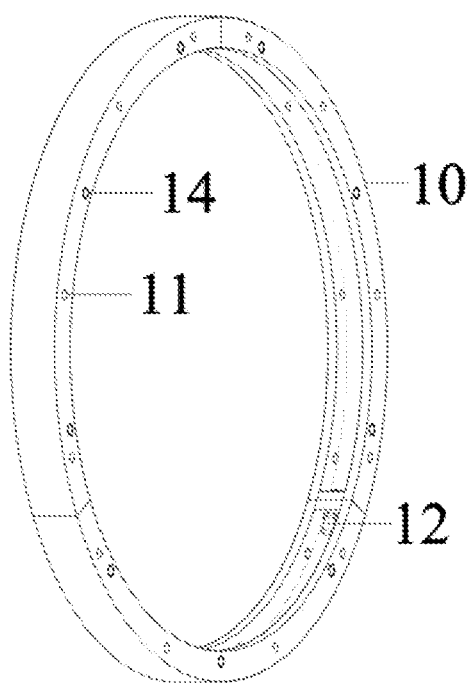
FIG. 2 is the three-dimensional illustration of the transitional grooved segmental ring structure of the instant invention.
Figure 8:
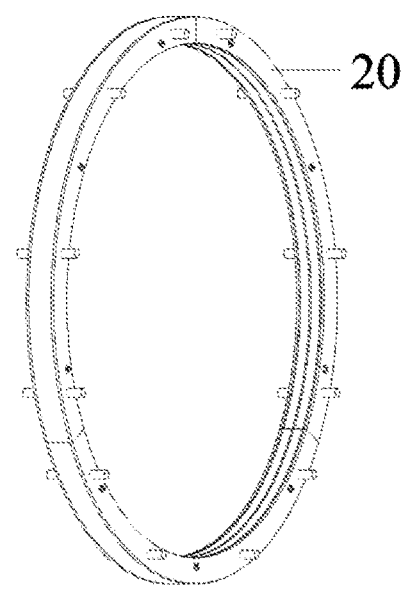
FIG. 8 is the three-dimensional illustration of the damper of the instant invention.
Figure 17:
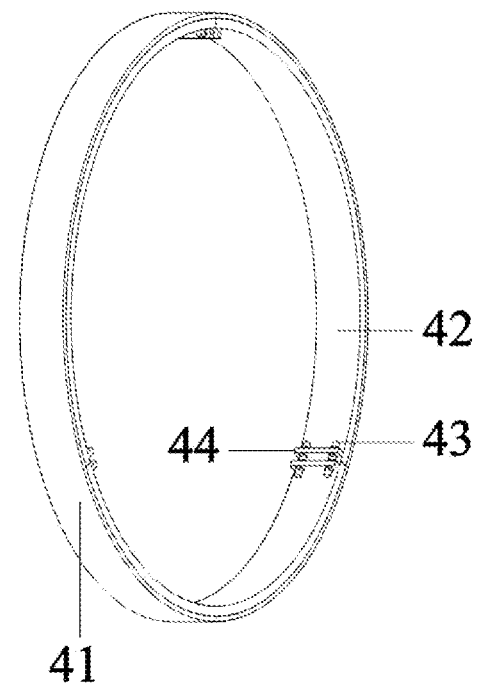
FIG. 17 is the three-dimensional illustration of the internal steel tube of the instant invention.
Figure 18:
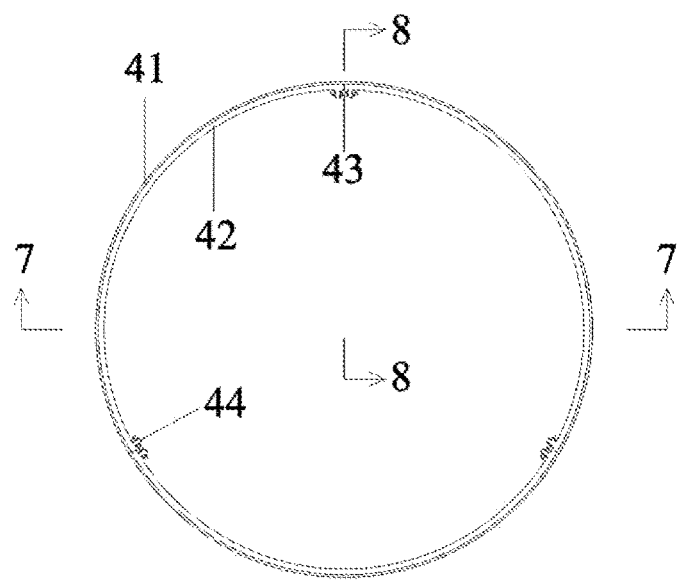
FIG. 18 is a plan view of the cross-section of the internal steel tube of the instant invention.
Figure 19:
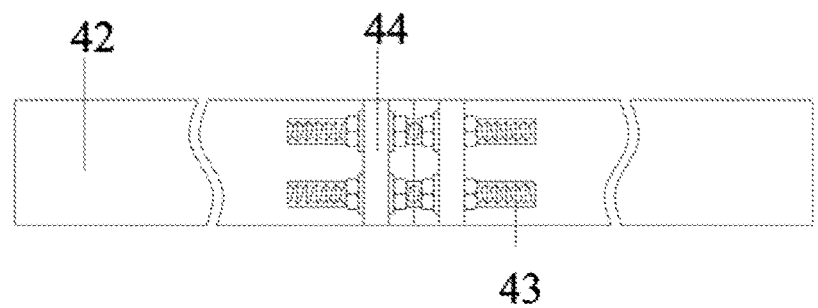
FIGS. 19-20 are vertical section views of the internal steel tube of the instant invention, corresponding to FIG. 18 and FIG. 17
Figure 20:
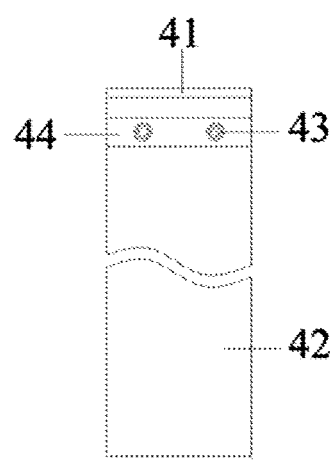

Referring more specifically to the drawings, especially FIGS. 1, 2, 8 and 17 the numeral generally designates the instant invention of the damping segmental ring structure. As FIG. shown, the invented damping segmental ring structure 100 preferably includes a transitional grooved segmental ring structure 1 as shown in FIG. 2, a damper 2 as shown in FIG. 8, an internal steel tube 3 as shown in FIG. 17, Type I waterproof rubber gaskets 4 are set between the damper and the transitional grooved segmental ring structures. The transitional grooved segmental ring structure 1 is made of reinforced concrete, the steel tube 3 is made of curved steel plates. The damper 2 is in the middle and bolts to the transitional grooved segmental ring structures 2 that are set at the two sides of the damper 2 by using the connection bolts 25. Internal steel tube 3 is concentric with the damper 2 and is concentric with but is set within the damper 2. A waterproof, slippage-proof rubber gasket 41 is set between the internal steel tube and the damper 2. The internal steel tube 3 closely contacts with and supports the damper 2 by compressing the gasket 41.

FIG. 2, FIG. 3, FIG. 4, FIG. 5, FIG. 6 and FIG. 7 are especially focused on the transitional grooved segmental ring structure 1. The transitional grooved segmental ring structure 1 consists of a plurality of pieces of arc-like grooved segmental structure 10. As FIG. 2, FIG. 4 and FIG. shown, Bolts 12 pass the preserved holes 13 in the transitional grooved segmental ring structure 10 and connect the arc-like pieces of the grooved segmental structures 10 in the circumferential direction to form the ring-shaped transitional grooved segmental ring structure 1. Numeral 11 designates the preserved holes in the arc-like piece of the transitional grooved segmental ring 10, which will accommodate the bolts that connect the piece of the arc-like grooved segmental ring structure 10 and the piece of arc-like damper 20. The number of the pieces of the arc-like grooved segmental structures 10 is half of the number of the regular segmental ring pieces in principle but it is typical to use 3 or 4 in practice, each piece of the arc-like grooved segmental structure 10 thus correspondingly has a central angle of 120 or 90 degrees.

Figure 3:
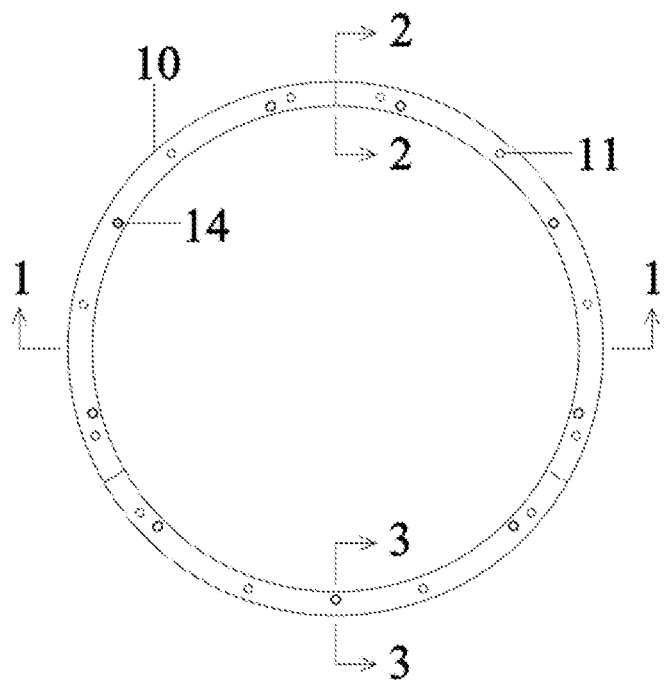
FIG. 3 is a plan view of the cross-section of the transitional grooved segmental ring structure of the instant invention.
Figure 4:
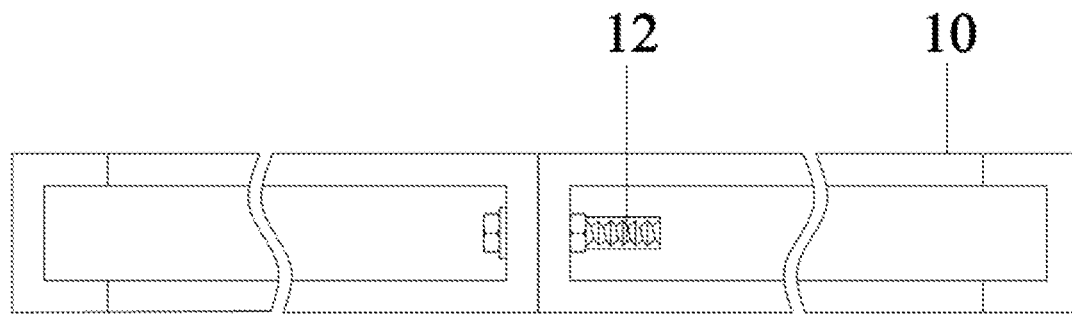
FIG. 4 is a fragmentary vertical section view of the transitional grooved segmental ring structure, corresponding to FIG. 3 and FIG. 2
Figure 5:
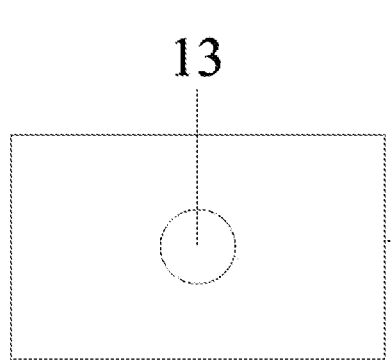
FIGS. 5-6 are vertical section views of the transitional grooved segmental ring structure of the instant invention, corresponding to FIG. 3 and FIG. 2.
Figure 6:
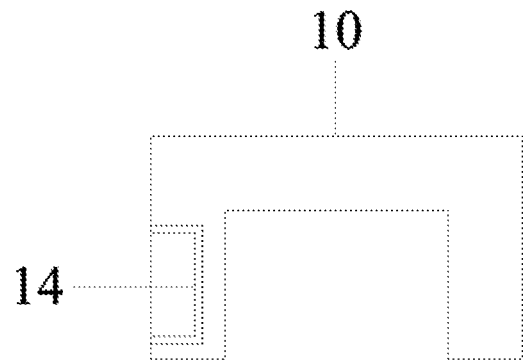
Figure 7:
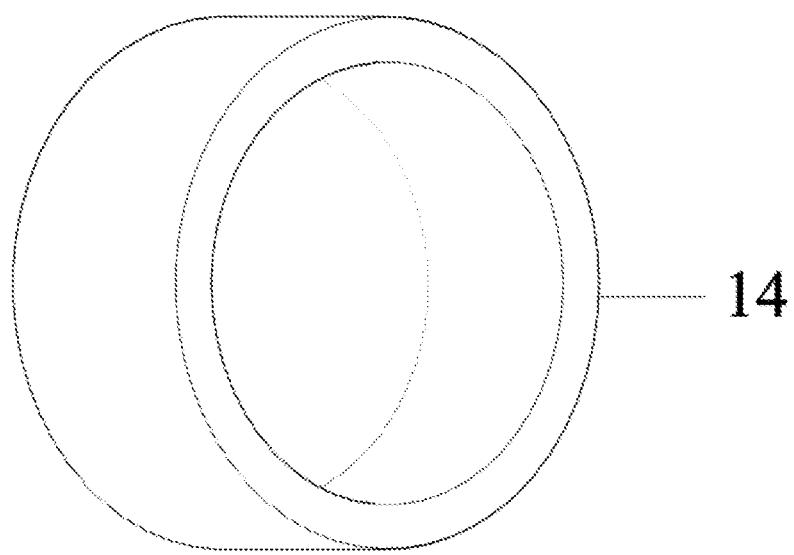
FIG. 7 is the three-dimensional illustration of the steel cap that is used to preserve a hole in the transitional grooved segmental ring structure.

As shown in FIG. 3, FIG. 6 and FIG. 7, a steel cap 14 is used to form a dent in the pre-casted grooved segmental structure 10. The dimensions of the steel cap 14 are consistent with the protruding parts of the spring systems 26 above the loading plates 21 and 23 of the arc-like pieces of the damper 20, which are connected in the circumferential direction to form the damper ring 2 and are shown in FIGS. 8, 9, 10 and 11.

Figure 9:
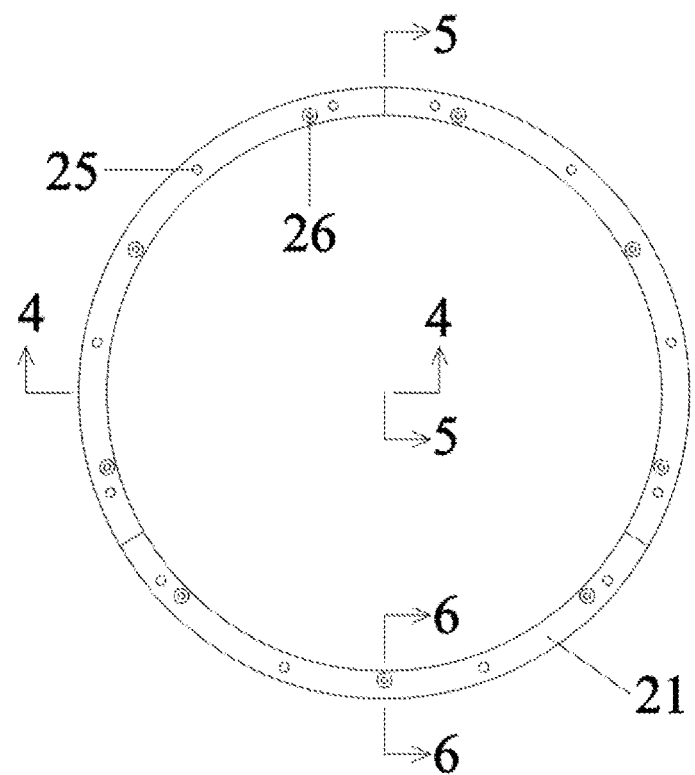
FIG. 9 is a plan view of the cross-section of the damper of the instant invention.
Figure 10:
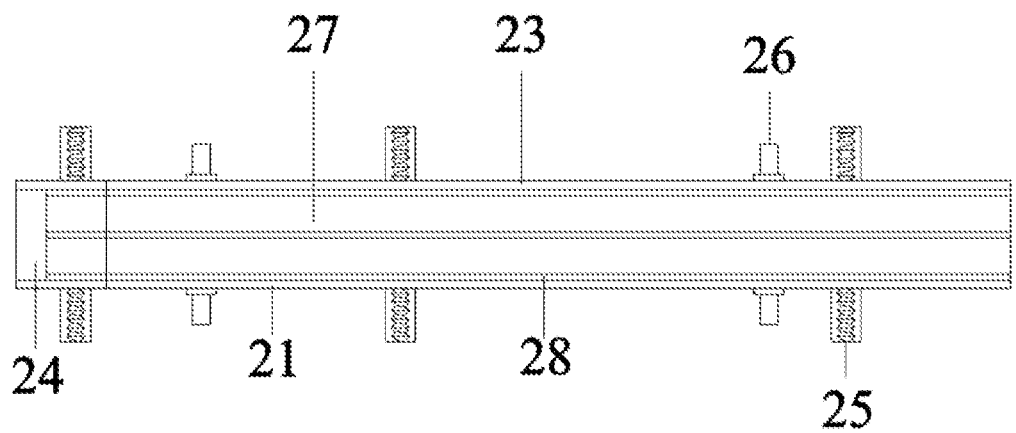
FIGS. 10-11 are vertical section views of the damper of the instant invention, corresponding to FIG. 9 and FIG. 8.
Figure 11:
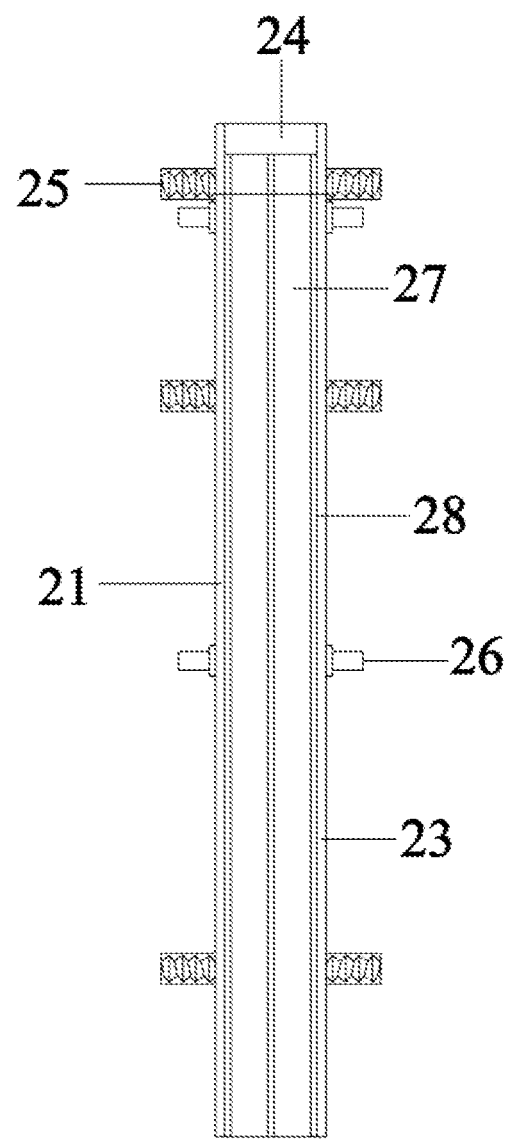
Figure 12:
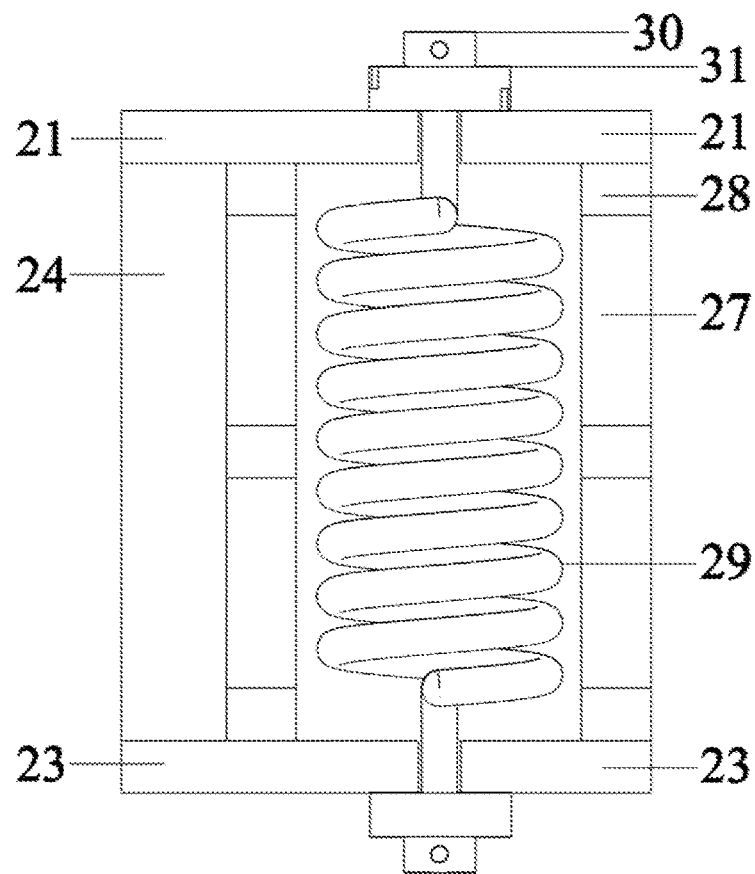
FIG. 12 is an illustrative section view of spring systems and the internal core of the damper.
Figure 13:
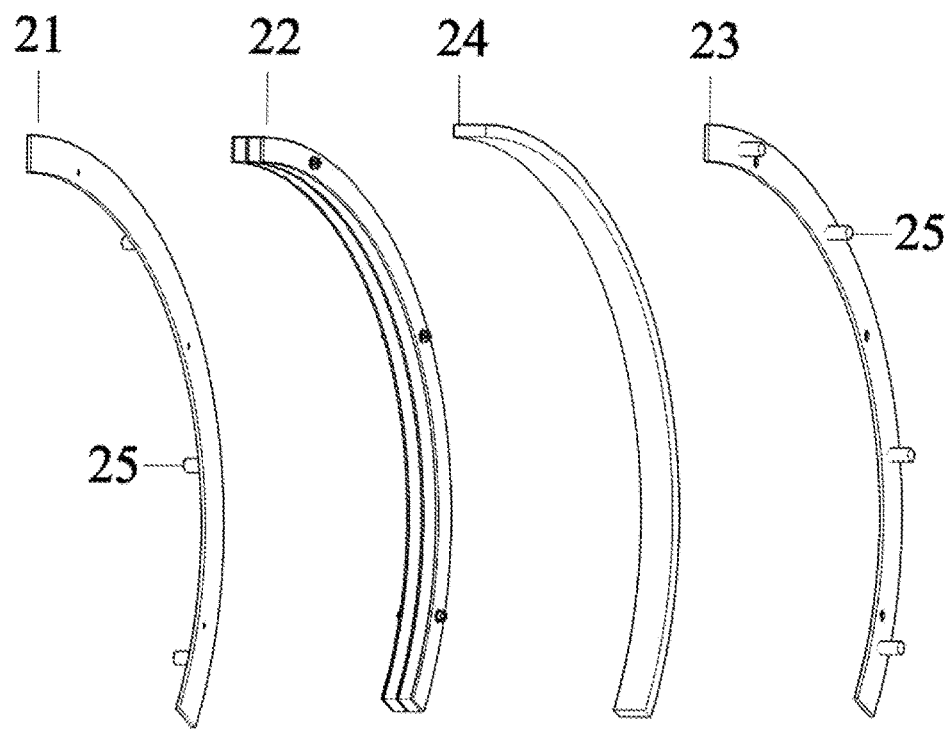
FIG. 13 is an exploded view of FIG. 8.
Figure 14:
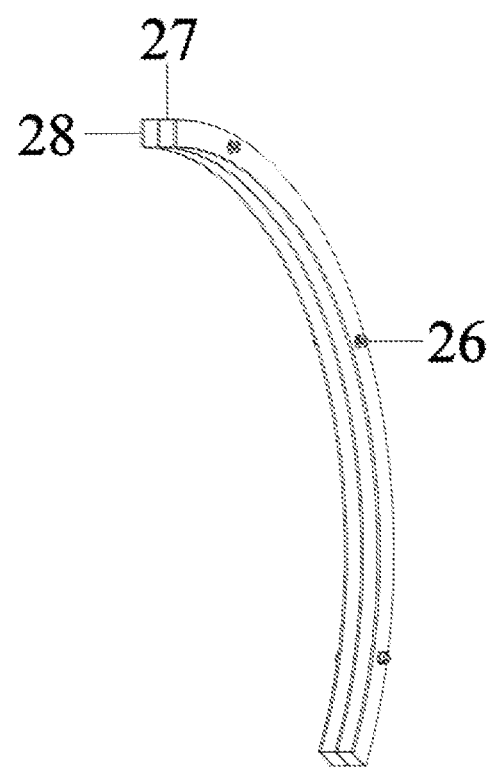
FIG. 14 is a three-dimensional illustration of the internal core of the damper piece.

FIGS. 8, 9, 10 11, 12, 13 and 14 are especially focused on the forms and features of the damper 2, which comprises a plurality of arc-like pieces of the damper 20. The number of the arc-like pieces of the damper 20 is consistent with that of the arc-like pieces of the transitional grooved segmental ring structure 10, thus each piece of the damper 20 has a central angle of degrees or 90 degrees, correspondingly. As shown in FIGS. 9, 10, 11, 12 and 13, each arc of the damper 20 consists of two loading plates 21 and 23, which are set as the external surfaces and form the shell of the arc of the damper 20. As shown in FIGS. 10,11, 12 and 13, a rubber waterproof gasket 24 is set in the external side surface of the internal core 22 to prevent water infiltration into the tunnel through the damper piece 20. As shown in FIG. 13, Numeral 22 designates the internal core of the arc-like damper piece 20, which consists of a plurality of steel plates 28 and rubber pads 27 as shown in FIGS. 10 and 11. As shown in FIGS. 9, 10, 1 land 12, at least two stout extension spring systems 26 need to be installed for one piece of the damper 20. The internal core 22 of the arc-like piece of the damper 20, comprises a plurality of interbedded rubber pads 27 and steel plates 28, which have preserved holes to have springs pass through and the springs 29 are locked to the loading plate 21 and 23 by locking clam 31. The spring system 26 comprises springs 29, hooking head 30, locking clamp 31 and washers 32. Note that an extension rod that will hook on hole 33 of the spring head 30 may be needed to have the waterproof rubber gasket 24, the rubber pads 27, steel plates 28 and the loading plate 23 or 21 to be installed appropriately. After that, hydraulic jacks are needed to pull the extension springs 29 via the extension rods hooking on the holes 33 preserved in the hooking head 30 of the spring system 26. When the springs 29 are pulled to the designed extension, locking clamps 31 and a vibration relief washer 32 are placed below the hooking head 30 of the spring system 26, the springs 29 will withdraw and compress the internal core 22 of the arc-like piece of the damper 20 when the pulling forces are removed. The rubber pads 27, the steel plates 28, and the waterproof rubber gasket 24 then will subject to compression that is caused by the withdrawal of the extended stout spring system 29. The compression will generate frictions among the contact surfaces between the rubber pads 27 and the steel plates 28, and the internal core 22 thus will remain stiffness to resist the soil and water pressure acting on the external side surface of the arc piece of the damper 20. In the meanwhile, the internal core 22 will be expanded, rotated when the external extension forces act on the springs 26 again. Such forces may come from the deformation/rotation of the ground caused by differential settlement or high-intensity earthquakes.

As shown in FIGS. 9, 10, 11 and 13, Bolts 25 are used to bolt the loading plates 21 and of the damper 20 to the two pieces of the arc-like transitional grooved segmental ring structure 10, which are set at the two ends of the damper 10.

Figure 15:
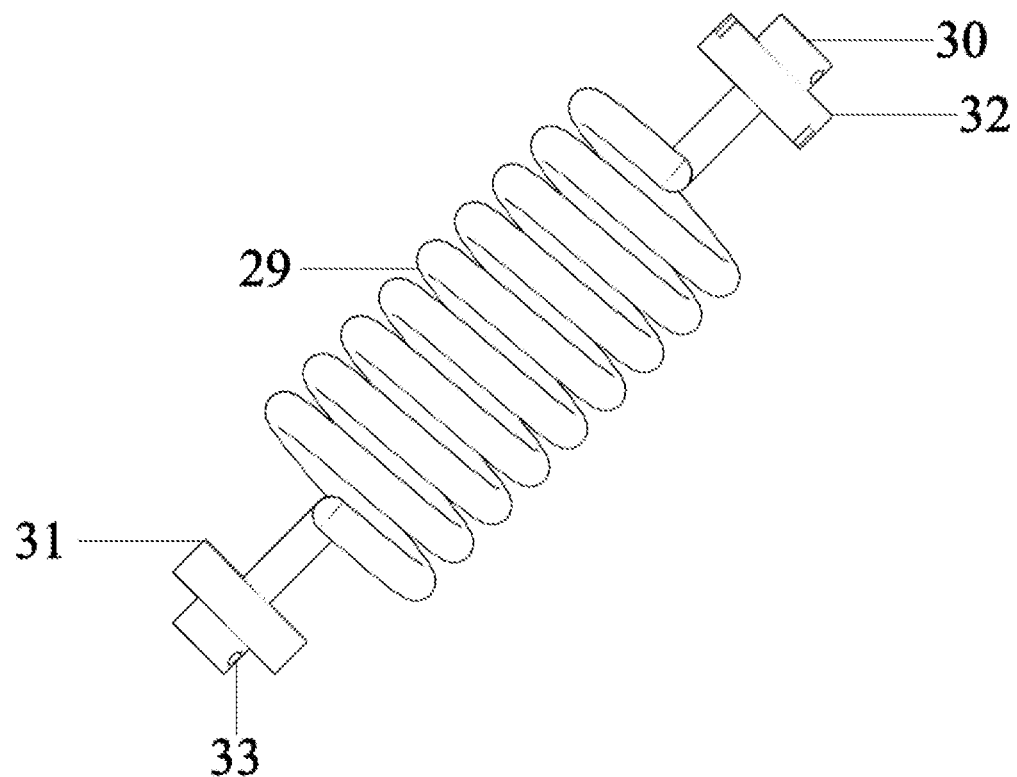
FIG. 15 is a three-dimensional illustration of the spring system of the damper.
Figure 16:
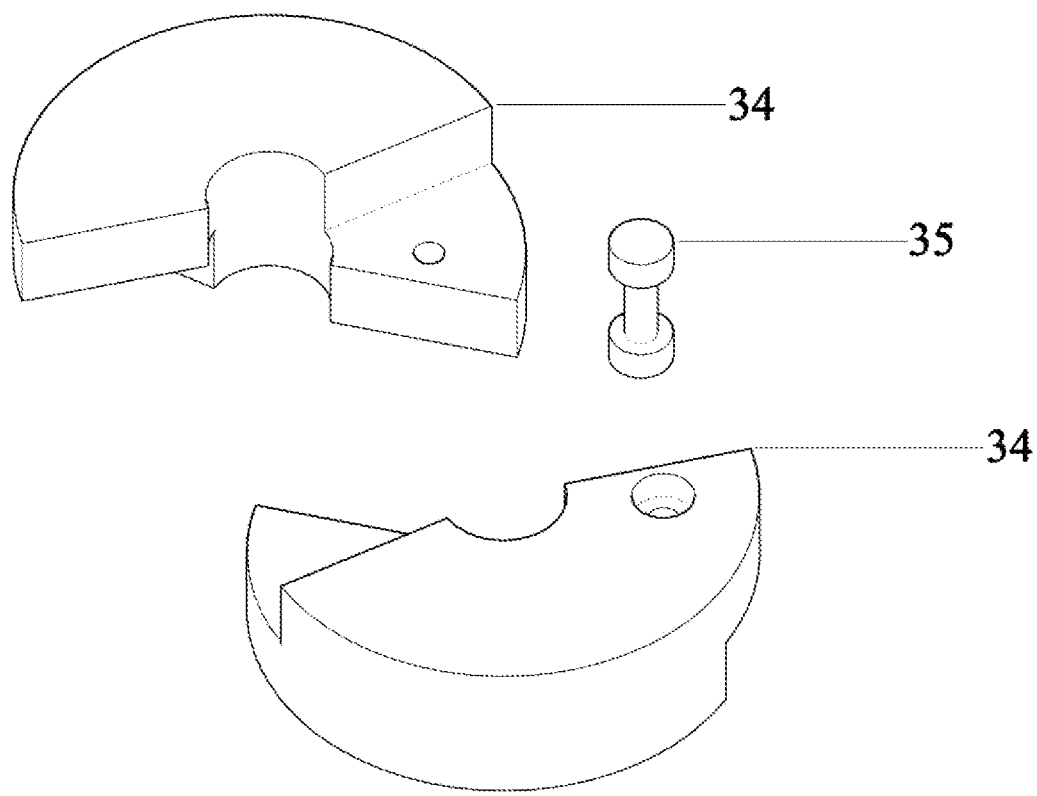
FIG. 16 is a three-dimensional illustration of the locking clamp of the stout extension spring.

FIGS. 15 and 16 focus on the spring systems 26 specifically that are used to generate the damping features of the damper 20. The spring system 26 consists of a stout spring 29, a hooking head 30 which has a predrilled hole 33 which is used to hook to the hydraulic jack, a locking clamp 31 and a vibration relief washer 32. The locking clamp 31 consists of a pintle and two steel leave 34.

The above steps can be easily completed in a manufactory that manufactures the normal segmental ring structures for tunnels. After two transitional segmental ring structure pieces, 10 and one damper piece, 20, are installed together, it will be shipped to the tunnel construction sites as other regular segmental ring structures and will be installed to the lining structure of the tunnel.

FIGS. 17, 18, 19 and 20 specifically focus on the internal steel tube 3. As shown in FIG. 17, the internal steel tube 3 consists of a plurality of arc-like pieces of the steel tube 42. The number of the arc-like piece of the steel tube 42 is the same as the number of arc-like piece of the damper 20. Each arc-like piece of the steel tube 42 thus has a central angle of 120 degrees for 3 pieces or 90 degrees for 4 pieces, correspondingly. The external surface of each arc-like piece of the internal steel tube 42 needs to install a waterproof, anti-slippery rubber gasket 41, and the arc-like internal steel tube piece 42 has flanges 44 in the ends of each piece, and the counter-reaction bolts 43 passes through the holes in flanges 44 and fasten the internal steel tube 42 to make it closely compress and contact the waterproof, anti-slippery rubber gasket 41 as well as the internal surface of the arc-like damper piece 20. The bolts 43 can be adjusted after the damper 2 and transitional grooved segmental ring structure 1 installed or during the operation of the tunnel, thus the internal steel tube 3 will not only further support the damper 2 to resist the soil and groundwater pressure but also make the damper 2 more adaptive for deformation and rotation as invented.

Figure 21:
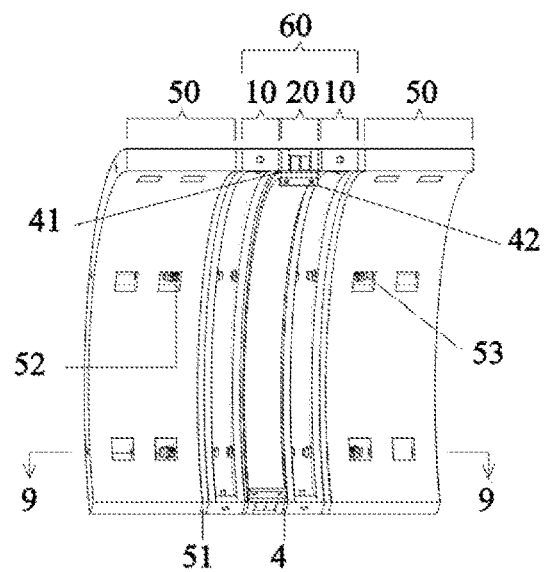
FIG. 21 is a three-dimensional illustration of one arc-piece of the instant invention connecting to the regular segmental ring structure.
Figure 22:
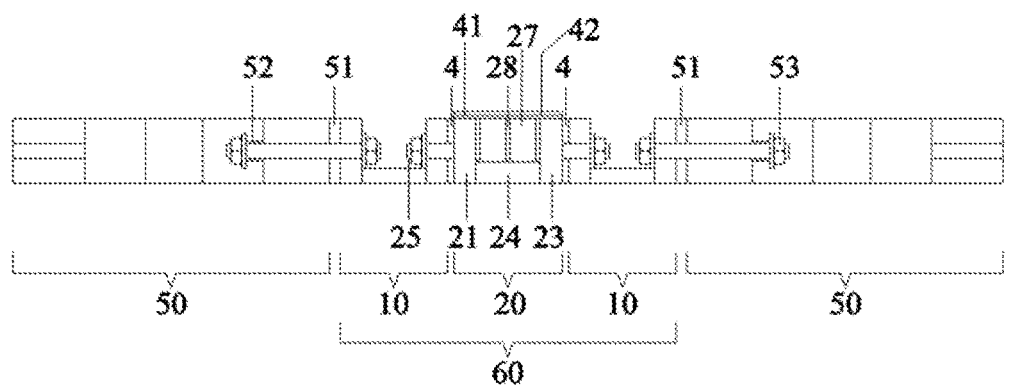
FIG. 22 is a vertical section view of one piece of the instant invention connecting to the regular segmental ring structure.

FIGS. 21 and 22 showed how the damper pieces, 20, and the transitional grooved segmental ring structure pieces, 10, are installed with the regular segmental ring structure piece of the tunnel. One damper piece 20 and two transitional grooved segmental ring structure pieces 10 are bolted together by bolts 25, and the transitional grooved segmental ring structure pieces 10 are bolted with the regular segmental ring structure pieces 50 by using the bolts 53, both are in the longitudinal direction as shown in FIG. 22. Type II waterproof rubber gaskets are set between the surfaces of the transitional grooved segmental ring structure piece 10 and the regular segmental ring structure piece 50, the water-proof, anti-slippery rubber gaskets are set between the internal surface of the damper piece 20 and the external surface of the internal steel tube piece 42, Type I waterproofing rubber gasket 4 are set between the surfaces between the loading plates 21 and 23 of the damper piece 20 and the side surface of transitional grooved segmental ring structure piece 10.

FIG. 22 further showed clearly that the sections of the damper piece 20 consists of the loadings plates 21 and 23, which form the shells of the damper piece 20 that contains the rubber pads 27 and steel plates 28. The steel tube piece 42 is set inside the damper piece 20 and the waterproof, anti-slippery rubber gaskets 41 are set between the interfaces. which Numeral 60 designates the installed damper pieces 20, the transitional grooved segmental ring structure pieces 10 as well as the internal steel tube piece 42.

Figure 23:
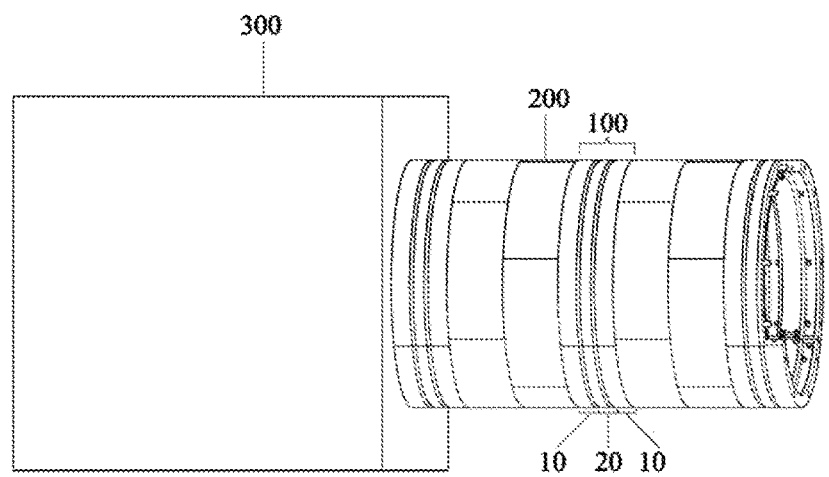
FIG. 23 is a three-dimensional illustration of a tunnel installed with the invented damping segmental ring structure and regular segmental ring structure and connected subway station structure.

Finally, FIG. 23 showed the invented damping segmental ring structure 100 partially installed with regular segmental ring structure 200. The damping segmental ring structure 100 consists of a plurality of the invented damping segmental ring structure 60 which comprises one damper piece 20 and two transitional grooved segmental ring structure pieces 10. Numeral depicts a structure which is different from the regular segmental ring structure 200 that is used as the tunnel lining.

It is worth noting that the invented damping segmental ring structure 100 is expected to be used in subway, or other tunnel projects that are built in grim environments where different settlement or earthquakes with high intensity are severe. Certainly, the cost of the invented damping segmental ring structure 100 is more expensive than a single regular segmental ring structure 200. However, the invented damping segmental ring structure 100 can be easily manufactured in a factory that manufactures the regular segmental ring structures and can be easily installed on construction sites by using the same TBM/Shield that is used for tunneling and lining erection. Installing the invented damping segmental ring structure 100 to parts of the ling rings in the affected area of the tunnel can mitigate the damages to the tunnel lining using the regular segmental ring structure 200, protect the lifeline infrastructure from the deterioration caused by differential settlement or earthquakes. In the point of the view, the invention will not only save a lot of construction cost but also have profound meanings to society. The invention has the potential to bring a revolution of the anti-seismic design for subway tunnels.

The foregoing is considered as illustrative only of the principles of the invention. Further, since numerous other modifications and changes readily will occur to those skilled in the art, it is not designed to limit the invention to the exact construction and operation shown and described, and accordingly, all suitable modification and equivalent may be resorted to, falling within the scope of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A damping segmental ring structure for subway tunnels built in deformable ground comprising:
    a damper comprising:
        front and rear loading plates that form a shell of the damper,
        rubber pads and steel plates that form an internal core, and a spring system configured to compress the internal core;

two transitional grooved segmental ring structures that are bolted to the front and rear loading plates; and an internal steel tube within and concentric with the damper, the internal steel tube comprising a plurality of internal steel tube pieces, wherein a contact pressure between an inside surface of the damper and the internal steel tube is adjustable by counter-reaction bolts installed in flanges of the internal steel tube pieces.

2. The damping segmental ring structure of claim 1, wherein the damper comprises a plurality of arc-like pieces, each arc-like piece of the damper comprising the rubber pads and the steel plates that are interbedded installed to form the internal core, wherein the rubber pads and the steel plates comprise predrilled holes for springs to pass through.

3. The damping segmental ring structure of claim 2, wherein the damper comprises at least two spring systems for each of the arc-like pieces, wherein each spring system is installed through the predrilled holes in the rubber pads and the steel plates and is locked to the front and rear loading plates of the damper by using locking clamps.

4. The damping segmental ring structure of claim 2, wherein the internal core is within the front and rear loading plates, wherein a waterproof rubber gasket is installed in an external side surface of the internal core.

5. The damping segmental ring structure of claim 1, wherein at least one of said transitional grooved segmental ring structures comprises a plurality of arc-like transitional grooved segmental ring structure pieces and a plurality of arc-like damper pieces.

6. The damping segmental ring structure of claim 1, wherein at least one of the transitional grooved segmental ring structures is bolted together in the circumferential and longitudinal directions, and also bolted to a regular segmental ring structure in the longitudinal direction, wherein waterproof rubber gaskets are used along with interfaces between the transitional grooved segmental ring structure and the regular segmental ring structure.

7. The damping segmental ring structure of claim 6, wherein said transitional grooved segmental ring structure comprises 3 or 4 arc-like pieces and each piece having a central angle of 120 degrees or 90 degrees, each arc-like piece of the transitional grooved segmental ring structure having a width that ranges between 1.5 feet to 2.0 feet and has the same outside and inside diameters as the regular segmental ring structure, wherein the transitional grooved segmental ring structure has edge thickness about 6 to 8 inches, and all the arc-like pieces of the transitional grooved segmental ring structures are bolted together using anchor bolts in a circumferential direction.

8. The damping segmental ring structure of claim 6, wherein the front and rear loading plates are made of steel and have the same outside and inside diameters as the regular segmental structure, and the thickness of each loading plate is 1.0 to 1.5 inches, and the holes are predrilled in the loading plates for anchor bolts and springs.

9. The damping segmental ring structure of claim 1, wherein the damper comprises 3 or 4 arc-like damper pieces and each arc-like damper piece has a central angle of 120 degrees or 90 degrees.

10. The damping segmental ring structure of claim 1, wherein the damper comprises a plurality of arc-like damper pieces, wherein the width of each damper piece is approximately 8 to 20 inches, each damper piece comprising at least two spring systems to provide sufficient compression, wherein the spring systems are locked to the front and rear loading plates of the damper.

11. The damping segmental ring structure of claim 1, wherein waterproof, anti-slippery rubber gaskets are placed along with the interfaces between an external surface of the internal steel tube and an internal surface of the damper.

12. The damping segmental ring structure of claim 11, wherein the internal steel tube comprises a plurality of arc-like pieces, each arc-like piece having a central angle of 120 degrees or 90 degrees, wherein counter-reaction bolts are used to bolt all pieces of the internal steel tube together and to adjust the contact pressure between the external surface of the internal steel tube, the waterproof anti-slippery gaskets, and the internal surface of the damper.

13. The damping segmental ring structure of claim 11, wherein the internal steel tube comprises a plurality of arc-like pieces, each arc-like piece having a thickness of 1.0 to 1.5 inches, wherein each arc-like piece comprises bent-up flanges at two ends having a length approximately 4.0 to 6.0 inches, wherein holes for counter-reaction bolts are predrilled in the bent-up flanges.

* * * * *